(12) United States Patent
Kashiuchi et al.

(10) Patent No.: US 10,940,624 B2
(45) Date of Patent: Mar. 9, 2021

(54) METHOD FOR CONTROLLING INJECTION MOLDING MACHINE AND INJECTION MOLDING MACHINE

(71) Applicant: Kabushiki Kaisha Meiki Seisakusho, Aichi (JP)

(72) Inventors: Hiroyuki Kashiuchi, Nagoya (JP); Kazuchika Asano, Nagoya (JP); Minetoshi Kako, Tokai (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 293 days.

(21) Appl. No.: 15/927,252

(22) Filed: Mar. 21, 2018

(65) Prior Publication Data

US 2018/0281259 A1    Oct. 4, 2018

(30) Foreign Application Priority Data

Mar. 30, 2017    (JP) .............................. JP2017-068104
Feb. 6, 2018    (JP) .............................. JP2018-018989

(51) Int. Cl.
*B29C 45/80*    (2006.01)
*B29C 45/04*    (2006.01)
(Continued)

(52) U.S. Cl.
CPC .......... *B29C 45/80* (2013.01); *B29C 45/0416* (2013.01); *B29C 45/1628* (2013.01); *B29C 45/67* (2013.01); *B29C 45/6728* (2013.01); *B29C 45/766* (2013.01); *B29C 45/82* (2013.01); *B29C 2045/1617* (2013.01);
(Continued)

(58) Field of Classification Search
USPC ........................................................ 425/155
See application file for complete search history.

(56) References Cited

U.S. PATENT DOCUMENTS

| 2009/0243148 | A1 | 10/2009 | Gruber | |
|---|---|---|---|---|
| 2010/0244314 | A1* | 9/2010 | Kato | B29C 45/80 264/255 |
| 2016/0224230 | A1* | 8/2016 | Fujita | B29C 45/76 |

FOREIGN PATENT DOCUMENTS

| JP | 02171221 | 2/1990 |
|---|---|---|
| JP | 2006198851 | 8/2006 |

(Continued)

*Primary Examiner* — Timothy Kennedy
*Assistant Examiner* — Farah Taufiq
(74) *Attorney, Agent, or Firm* — Renner, Otto, Boisselle & Sklar, LLP

(57) ABSTRACT

In an injection molding machine in which intermediate molds are disposed movably in a mold opening/closing direction between a movable platen attached with a movable mold and a stationary platen attached with a stationary mold, setting is simplified when individually setting a setting value related to molding using the movable mold and the intermediate mold and a setting value related to molding using the stationary mold and the intermediate mold. In a method for controlling an injection molding machine in which intermediate molds are disposed movably in a mold opening/closing direction between a movable platen attached with a movable mold and a stationary platen attached with a stationary mold, single setting enables setting of both of a setting value related to molding using the movable mold and the intermediate mold and a setting value related to molding using the stationary mold and the intermediate mold.

10 Claims, 9 Drawing Sheets

(51) Int. Cl.
  *B29C 45/76* (2006.01)
  *B29C 45/82* (2006.01)
  *B29C 45/67* (2006.01)
  *B29C 45/16* (2006.01)

(52) U.S. Cl.
  CPC .............. *B29C 2945/76581* (2013.01); *B29C 2945/76598* (2013.01); *B29C 2945/76702* (2013.01); *B29C 2945/76732* (2013.01); *B29C 2945/76866* (2013.01); *B29C 2945/76872* (2013.01)

(56) References Cited

FOREIGN PATENT DOCUMENTS

| | | |
|---|---|---|
| JP | 2009534235 | 9/2009 |
| JP | 2009534235 A | 9/2009 |
| JP | 2015186874 A * | 10/2015 |
| WO | 2009118833 A1 | 10/2009 |

* cited by examiner

METHOD FOR CONTROLLING INJECTION MOLDING MACHINE AND INJECTION MOLDING MACHINE

CROSS REFERENCE TO RELATED APPLICATIONS

This application claims the priority benefit of Japanese Patent Application No. 2017-68104, filed on Mar. 30, 2017, and Japanese Patent Application No. 2018-18989, filed on Feb. 6, 2018. The entirety of the above-mentioned patent applications is hereby incorporated by reference herein and made a part of this specification.

BACKGROUND

1. Technical Field

The present invention relates to a method for controlling an injection molding machine and to an injection molding machine.

2. Related Art

An injection molding machine described in Japanese Patent Application Laid-Open No. H02-171221 (see claims, upper left and upper right columns in page 8, and FIG. 1) has been known as a conventional injection molding machine having a following configuration. In the injection molding machine, intermediate molds are disposed movably in a mold opening/closing direction between a movable platen attached with a movable mold and a stationary platen attached with a stationary mold, and individually by mold opening/closing means, the stationary mold and the intermediate mold are closed, and the movable mold and the intermediate mold are closed, whereby cavities are formed individually therebetween, and then mold clamping is performed by mold clamping means. In the injection molding machine described above, the movable platen and the movable mold are moved by mold opening/closing means for the movable platen and the movable mold so as to be opened/closed, and the intermediate molds are moved by mold opening/closing means for the intermediate molds so as to be opened/closed. In Japanese Patent Application Laid-Open No. H02-171221 (see claims, upper left and upper right columns in page 8, and FIG. 1), when the molds are opened, a moving distance of the moving platen is twice that of a rotating plate, but timing of completion of mold closing can be matched between a first mold K1 on one side and a second mold K2 on the other side.

In this type of the conventional injection molding machine, it has been common that mold opening amounts of the mold K1 on one side and of the mold K2 on the other side are equal to each other. Then, a moving speed of the moving platen with respect to the stationary platen during the mold opening/closing has been twice a moving speed of the rotating plate with respect to the stationary platen.

However, even with this type of injection molding machine, as described in Published Japanese Translation of PCT International Publication No. 2009-534235 (see representative drawing and paragraphs 0028 and 0033), such an injection molding machine is disclosed, in which a mold opening amount of a mold on one side and a mold opening amount of a mold on the other side are differentiated from each other. In Published Japanese Translation of PCT International Publication No. 2009-534235 see representative drawing and paragraphs 0028 and 0033), a mixing head is capable of entering a space between halves of the mold on one side by a movable first robot arm when the molds are opened. Therefore, the mold opening amount in the mold on one side is larger.

SUMMARY

However, in Japanese Patent Application Laid-Open No. H02-171221 (see claims, upper left and upper right columns in page 8, and FIG. 1) and Published Japanese Translation of PCT International Publication No. 2009-534235 (see representative drawing and paragraphs 0028 and 0033), there is no description as to how to input setting values related to molding using the movable mold and the intermediate mold and setting values related to molding using the stationary mold and the intermediate mold in the injection molding machine described above. As described above, the injection molding machine has the configuration, in which the intermediate molds are disposed movably in the mold opening/closing direction between the movable platen attached with the movable mold and the stationary platen attached with the stationary mold, and individually by the mold opening/closing means, the stationary mold and the intermediate mold are closed, and the movable mold and the intermediate mold are closed, whereby the cavities are formed individually therebetween, and then the mold clamping is performed by the mold clamping means. Therefore, in the case of entering the setting value for each of the molds, input work has been troublesome.

Moreover, in particular, in the case of differentiating the mold opening amount between the mold on one side and the mold on the other side as in Published Japanese Translation of PCT International Publication No. 2009-534235 (see representative drawing and paragraphs 0028 and 0033) described above, there has been a problem that the molds may possibly collide with each other when the moving speed of the moving platen with respect to the stationary platen when the molds are closed is twice the moving speed of the rotating plate with respect to the stationary platen as in Japanese Patent Application Laid-Open No. H02-171221 (see claims, upper left and upper right columns in page 8, and FIG. 1). For example, in an injection molding machine provided with a moving mechanism of the rotating plate between the rotating plate and the movable platen, when the setting of the mold opening amount between the rotating plate and the movable platen is maximum, the setting of the mold opening amount between the stationary platen and the rotating plate is minimum, and mold closing control is performed simultaneously for a pair of the stationary platen and the rotating plate and a pair of the rotating plate and the moving platen while equally setting mold closing speeds of both of the pairs, then it is also conceivable that the mold attached to the rotating plate may collide with the mold attached to the stationary platen.

Therefore, even when the mold opening amount is differentiated between the mold on one side and the mold on the other side as in Published Japanese Translation of PCT International Publication No. 2009-534235 (see representative drawing and paragraphs 0028 and 0033), both of a mold opening speed and mold closing speed are individually set and input together with the mold opening amounts of both of the molds at the time of setting. Therefore, similarly to the above, setting work for the mold opening speed and the mold closing speed has become complicated.

In view of the above problems, it is an object of the present invention, in the injection molding machine in which the intermediate molds are disposed movably in the mold opening/closing direction between the movable platen attached with the movable mold and the stationary platen attached with the stationary mold, and individually by the mold opening/closing means, the stationary mold and the intermediate mold are closed, and the movable mold and the intermediate mold are closed, whereby the cavities are formed individually therebetween, and then the mold clamping is performed by the mold clamping means, to provide a method for controlling an injection molding machine, which makes it possible to simplify setting input when individually setting the setting value related to the molding using the movable mold and the intermediate mold and the setting value related to the molding using the stationary mold and the intermediate mold, and to provide the injection molding machine.

Moreover, in view of the above problems, it is an object of the present invention, in the injection molding machine, in which the intermediate molds are disposed movably in the mold opening/closing direction between the movable platen attached with the movable mold and the stationary platen attached with the stationary mold, and individually by the mold opening/closing means, the stationary mold and the intermediate mold are closed, and the movable mold and the intermediate mold are closed, whereby the cavities are formed therebetween, and then the mold clamping is performed by the mold clamping means, to provide a method for controlling an injection molding machine, which makes it possible to simplify setting of the mold opening speed even when the mold opening amount is differentiated between the mold on one side and the mold on the other side and further makes it possible to avoid a problem such as the collision of the molds, and to provide the injection molding machine.

A method for controlling an injection molding machine according to claim 1 of the present invention is a method for controlling an injection molding machine in which intermediate molds are disposed movably in a mold opening/closing direction between a movable platen attached with a movable mold and a stationary platen attached with a stationary mold, and by mold opening/closing means, the stationary mold and the intermediate mold are closed, and the movable mold and the intermediate mold are closed, cavities are formed between the stationary mold and the intermediate mold and between the intermediate mold and the movable mold, and mold clamping is performed by mold clamping means, wherein single setting enables setting of both of a setting value related to molding using the movable mold and the intermediate mold and a setting value related to molding using the stationary mold and the intermediate mold.

A method for controlling an injection molding machine according to claim 2 of the present invention is characterized in that in claim 1, single setting enables setting of at least either a setting value when opening the movable mold and the intermediate mold and a setting value when opening the stationary mold and the intermediate mold or a setting value when closing the movable mold and the intermediate mold and a setting value when closing the stationary mold and the intermediate mold.

A method for controlling an injection molding machine according to claim 3 of the present invention is characterized in that in claim 2, single setting enables setting of at least either a setting value of a mold opening speed when opening the movable mold and the intermediate mold and a setting value of a mold opening speed when opening the stationary mold and the intermediate mold or a setting value of a mold closing speed when closing the movable mold and the intermediate mold and a setting value of a mold closing speed when closing the stationary mold and the intermediate mold.

A method for controlling an injection molding machine according to claim 4 of the present invention is a method for controlling an injection molding machine in which intermediate molds are disposed movably in a mold opening/closing direction between a movable platen attached with a movable mold and a stationary platen attached with a stationary mold, and by mold opening/closing means, the stationary mold and the intermediate mold are closed, and the movable mold and the intermediate mold are closed, cavities are formed between the stationary mold and the intermediate mold and between the intermediate mold and the movable mold, and mold clamping is performed by mold clamping means, wherein a mold opening amount between the movable mold and the intermediate mold and a mold opening amount between the stationary mold and the intermediate mold are separately settable, and single setting enables setting of at least either a mold opening speed when opening the movable mold and the intermediate mold and a mold opening speed when opening the stationary mold and the intermediate mold or a mold closing speed when closing the movable mold and the intermediate mold and a mold closing speed when closing the stationary mold and the intermediate mold.

A method for controlling an injection molding machine according to claim 5 of the present invention is characterized in that in claim 3, movement is controlled at same speed for at least either a mold opening speed when opening the movable mold and the intermediate mold at high speed and a mold opening speed when opening the stationary mold and the intermediate mold at high speed or a mold closing speed when closing the movable mold and the intermediate mold at high speed and a mold closing speed when closing the stationary mold and the intermediate mold at high speed.

A method for controlling an injection molding machine according to claim 6 of the present invention is characterized in that in claim 4, movement is controlled at same speed for at least either a mold opening speed when opening the movable mold and the intermediate mold at high speed and a mold opening speed when opening the stationary mold and the intermediate mold at high speed or a mold closing speed when closing the movable mold and the intermediate mold at high speed and a mold closing speed when closing the stationary mold and the intermediate mold at high speed.

A method for controlling an injection molding machine according to claim 7 of the present invention is characterized in that in claim 4, at least either a mold opening time of the movable mold and the intermediate mold and a mold opening time of the stationary mold and the intermediate mold or a mold closing time of the movable mold and the intermediate mold and a mold closing time of the stationary mold and the intermediate mold is subjected to movement control for a same time even if the mold opening amount between the movable mold and the intermediate mold is different from the mold opening amount between the stationary mold and the intermediate mold.

A method for controlling an injection molding machine according to claim 8 of the present invention is characterized in that in claim 1, a molding mold composed of the movable mold and the intermediate mold and a molding mold composed of the stationary mold and the intermediate mold are molds which mold same molded products, and single setting enables setting of both of a setting value related to molding using the molding mold composed of the movable mold and the intermediate mold and a setting value related to molding using the molding mold composed of the stationary mold and the intermediate mold.

A method for controlling an injection molding machine according to claim 9 of the present invention is characterized in that in claim 2, a molding mold composed of the movable mold and the intermediate mold and a molding mold composed of the stationary mold and the intermediate mold are molds which mold same molded products, and single setting enables setting of both of a setting value related to molding using the molding mold composed of the movable mold and the intermediate mold and a setting value related to molding using the molding mold composed of the stationary mold and the intermediate mold.

A method for controlling an injection molding machine according to claim 10 of the present invention is characterized in that in claim 3, a molding mold composed of the movable mold and the intermediate mold and a molding mold composed of the stationary mold and the intermediate mold are molds which mold same molded products, and single setting enables setting of both of a setting value related to molding using the molding mold composed of the movable mold and the intermediate mold and a setting value related to molding using the molding mold composed of the stationary mold and the intermediate mold.

An injection molding machine according to claim 11 of the present invention is an injection molding machine in which intermediate molds are disposed movably in a mold opening/closing direction between a movable platen attached with a movable mold and a stationary platen attached with a stationary mold, and by mold opening/closing means, the stationary mold and the intermediate mold are closed, and the movable mold and the intermediate mold are closed, cavities are formed between the stationary mold and the intermediate mold and between the intermediate mold and the movable mold, and mold clamping is performed by mold clamping means, wherein single setting enables setting of both of a setting value related to molding using the movable mold and the intermediate mold and a setting value related to molding using the stationary mold and the intermediate mold.

An injection molding machine according to claim 12 of the present invention is characterized in that in claim 11, single setting enables setting of at least either a setting value when opening the movable mold and the intermediate mold and a setting value when opening the stationary mold and the intermediate mold or a setting value when closing the movable mold and the intermediate mold and a setting value when closing the stationary mold and the intermediate mold.

An injection molding machine according to claim 13 of the present invention is characterized in that in claim 11, single setting enables setting of both of a setting value of an injection device related to the molding using the movable mold and the intermediate mold and a setting value of an injection device related to the molding using the stationary mold and the intermediate mold.

In the method for controlling an injection molding machine in which intermediate molds are disposed movably in a mold opening/closing direction between a movable platen attached with a movable mold and a stationary platen attached with a stationary mold, and by mold opening/closing means, the stationary mold and the intermediate mold are closed, and the movable mold and the intermediate mold are closed, cavities are formed between the stationary mold and the intermediate mold and between the intermediate mold and the movable mold, and mold clamping is performed by mold clamping means, single setting enables setting of both of a setting value related to molding using the movable mold and the intermediate mold and a setting value related to molding using the stationary mold and the intermediate mold. Therefore, the setting can be simplified.

Moreover, the method for controlling an injection molding machine according to the present invention is a method for controlling an injection molding machine in which intermediate molds are disposed movably in a mold opening/closing direction between a movable platen attached with a movable mold and a stationary platen attached with a stationary mold, and by mold opening/closing means, the stationary mold and the intermediate mold are closed, and the movable mold and the intermediate mold are closed, cavities are formed between the stationary mold and the intermediate mold and between the movable mold and the intermediate mold, and mold clamping is performed by mold clamping means, wherein a mold opening amount between the movable mold and the intermediate mold and a mold opening amount between the stationary mold and the intermediate mold are separately settable, and single setting enables setting of at least either a mold opening speed when opening the movable mold and the intermediate mold and a mold opening speed when opening the stationary mold and the intermediate mold or a mold closing speed when closing the movable mold and the intermediate mold and a mold closing speed when closing the stationary mold and the intermediate mold. Therefore, the setting of the mold opening speed or the mold closing speed can be simplified.

DETAILED DESCRIPTION

Figure 1:
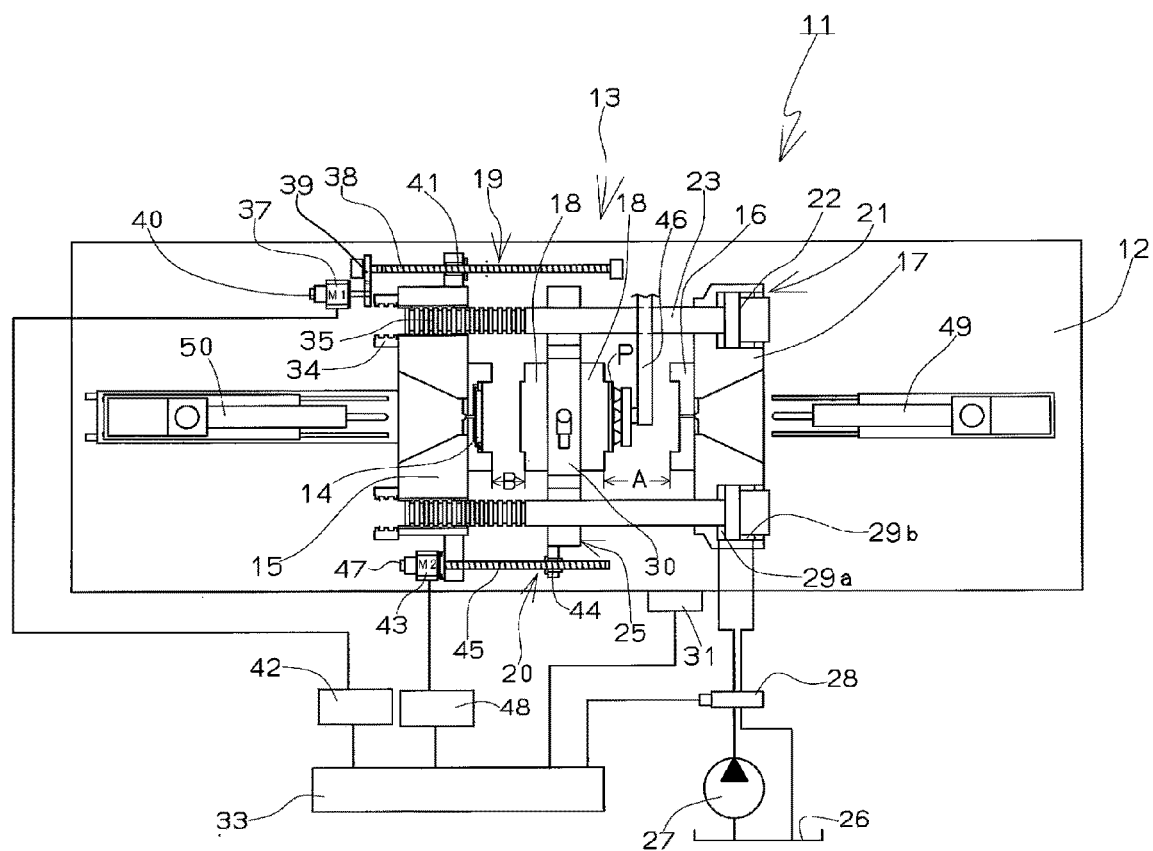
FIG. 1 is a plan view of an injection molding machine according to an embodiment of the present invention, showing a state in which a mold on one side and a mold on the other side are opened with different mold opening amounts.

An injection molding machine 11 according to an embodiment of the present invention will be described with reference to FIGS. 1 and 2. The injection molding machine 11 is an injection molding machine for a composite molded product using two types of materials. A mold clamping device 13 is disposed on an upper surface of a bed 12. In the mold clamping device 13, intermediate molds 18 and 18 are disposed movably in a mold opening/closing direction between a movable platen 15 attached with a movable mold 14 and a stationary platen 17 attached with a stationary mold 16, and by mold opening/closing means 19 and 20, the stationary mold 16 and the intermediate mold 18 are closed, and the movable mold 14 and the intermediate mold 18 are closed, whereby cavities C1 and C2 are formed therebetween, respectively, and then mold clamping is performed by mold clamping means 21.

Mold clamping cylinders 22 of the mold clamping means 21 are provided near four corners of the stationary platen 17, and rods of the mold clamping cylinders 22 are tie bars 23. The tie bars 23 are also inserted through the movable platen 15 movable in the mold opening/closing direction with respect to the stationary platen 17 and through an intermediate member 25 which is located between the stationary platen 17 and the movable platen 15 and is movable in the mold opening/closing direction. Each of the mold clamping cylinders 22 is hydraulically operated, in which hydraulic oil is supplied from a pump 27, which is connected to a tank 26, via a switching valve 28 to a mold clamping side oil chamber 29a or mold opening side oil chamber 29b of the mold clamping cylinder 22. The mold clamping means is not limited to the mold clamping cylinder 22 as shown in FIG. 1. The movable mold 14 is attached to the movable platen 15, and a half nut 34 is provided near an insertion portion of the tie bar 23 on an outer side surface of the movable platen 15. The half nut 34 is movable forward and backward by driving means (not shown), and is engaged with a locking portion 35 provided on the tie bar 23. A rotating plate 30 which is a part of the intermediate member 25 is rotatably attached to the intermediate member 25, and the intermediate molds 18 and 18 are individually attached to both sides of the rotating plate 30.

In addition, the injection molding machine 11 includes: mold opening/closing means 19 for the movable platen for moving the movable platen 15 (including the movable mold 14) in the mold opening/closing direction; and mold opening/closing means 20 for the intermediate member for moving the intermediate member 25 (including the rotating plate 30 and the intermediate molds 18 and 18) in the mold opening/closing direction. In the mold opening/closing means 19 for the movable platen (mold opening/closing means for the movable mold), a drive shaft of a servomotor 37 (M1) fixed on the bed 12 and a ball screw shaft 38 pivotally supported on the bed 12 are joined to each other via a belt 39 or the like. Moreover, the servomotor 37 is provided with a rotary encoder 40 that detects a rotation angle thereof. A ball screw nut 41 is fixed to a bracket on a side surface of the movable platen 15, and the ball screw shaft 38 is inserted into the ball screw nut 41. Furthermore, the servomotor 37 is connected via a servo amplifier 42 to a control device 33 that controls the entire injection molding machine 11. FIGS. 1 and 2 show only one mold opening/closing means 19 for the movable platen, but in general, two to four mold opening/closing means 19 for the movable platen are provided.

With regard to the mold opening/closing means 20 (mold opening/closing means for the intermediate molds) for the intermediate member for opening/closing the mold between the movable platen 15 and the intermediate member 25, a servomotor 43 (M2) is fixed to a bracket on a side surface of the movable platen 15, a ball screw nut 44 is fixed to the intermediate member 25, and a ball screw shaft 45 inserted through the ball screw nut 44 is joined to a drive shaft of the servomotor 43. The servomotor 43 is also provided with a rotary encoder 47 similarly to the servomotor 37. Moreover, the servomotor 43 is connected via a servo amplifier 48 to the control device 33 that controls the entire injection molding machine 11. FIGS. 1 and 2 show only one mold opening/closing means 20 for the intermediate member, but in general, two to four mold opening/closing means 20 for the intermediate member are provided. Note that a method for joining the servomotor 37 and the ball screw shaft 38 to each other and joining the servomotor 43 and the ball screw shaft 45 to each other is not limited to the above. Moreover, the mold opening/closing means 19 for the movable platen and the mold opening/closing means 20 for the intermediate member are not limited to the above mechanisms, and may be those using different electric drive mechanisms or using hydraulic cylinders. Furthermore, position sensors for use in controlling the mold opening/closing means 19 for the movable platen and the mold opening/closing means 20 for the intermediate member may be linear sensors and the like.

A first injection device 49 is provided on the bed 12 on an outer side of the stationary platen 17, and a second injection device 50 that moves together with the movable platen 15 is provided on an outer side of the movable platen 15. Arrangement of the injection devices 49 and 50 is not limited to this. In the present embodiment, ejector devices (not shown) are attached to the intermediate molds 18 and 18. When the stationary mold 16 and the intermediate mold 18 are opened, a taking-out machine 46 is capable of entering a cavity therebetween and taking out an already-molded composite molded product P therefrom. However, molds attached with the ejector devices may also be the stationary mold 16 or the movable mold 14.

Figure 2:
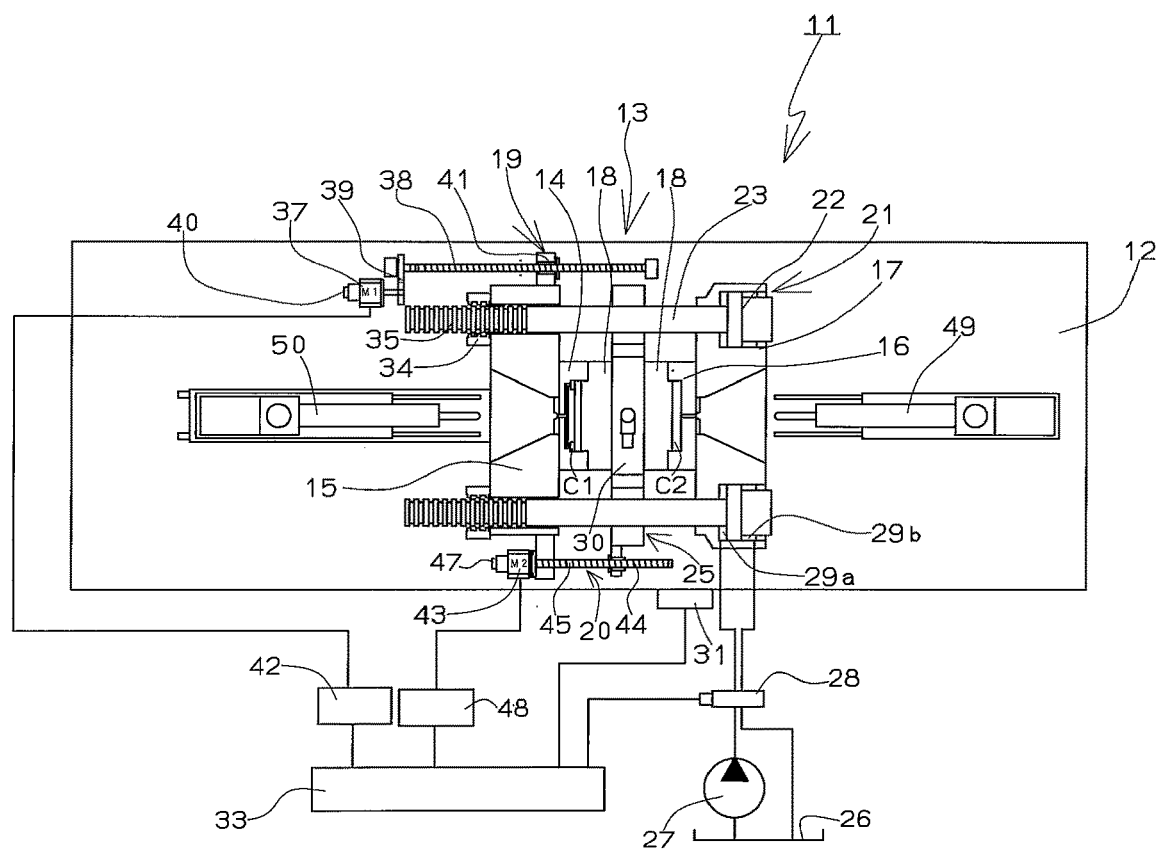
FIG. 2 is a plan view of the injection molding machine according to the embodiment of the present invention, showing a state in which the mold on one side and the mold on the other side are closed.
Figure 3:
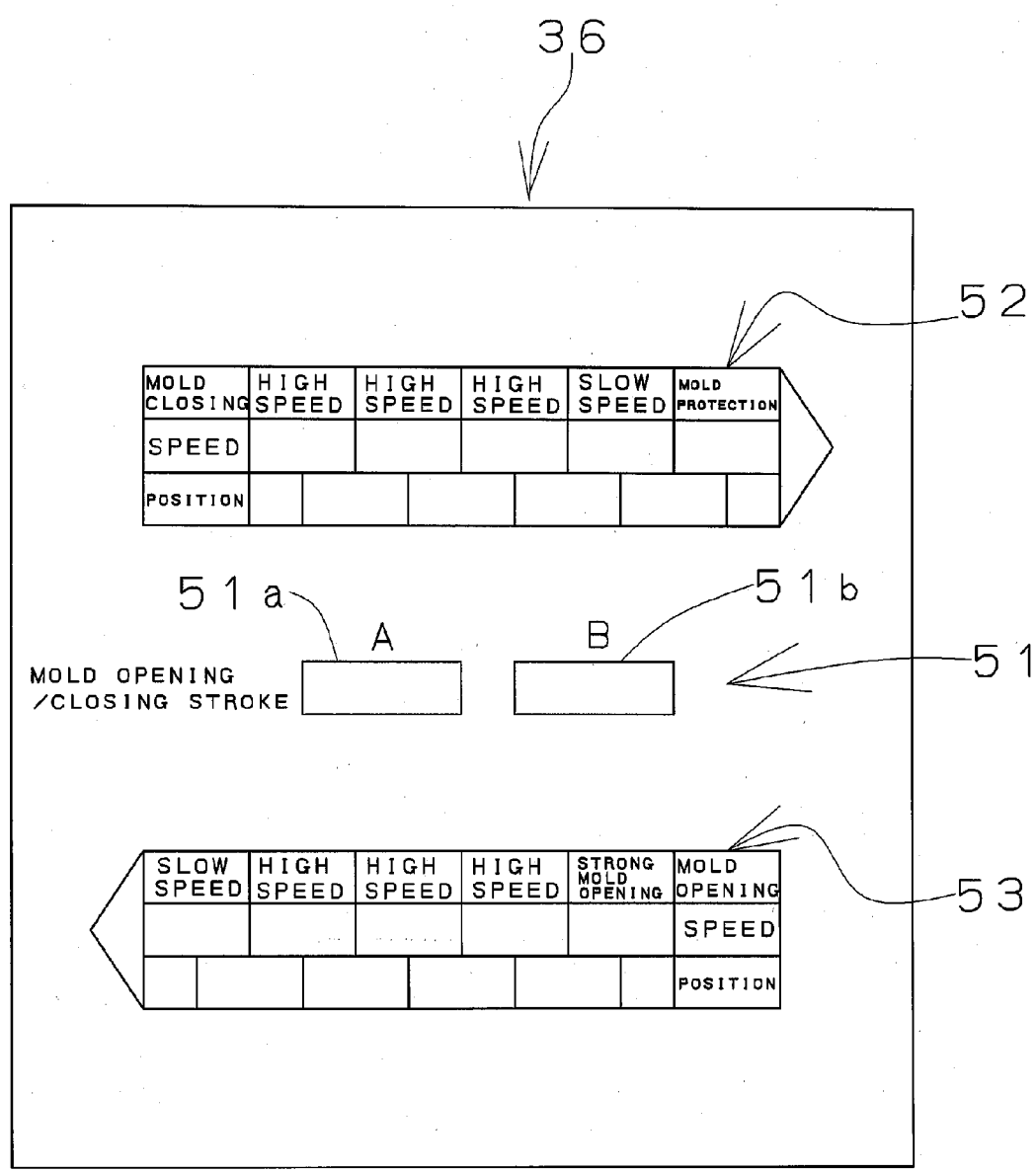
FIG. 3 is a diagram showing a setting screen of the injection molding machine according to the embodiment of the present invention.

A control panel 31 is provided on the bed 12 on an operation side (lower side in FIG. 1). The control panel 31 is provided with a touch panel-type setting display screen, and is capable of selectively displaying a large number of setting display screens stored in the control device 33, the setting display screens including an injection setting display screen, a mold clamping setting display screen, a mold opening/closing setting display screen 36, and the like. As shown in FIG. 3, the mold opening/closing setting display screen 36 includes a mold opening amount setting display portion 51, a mold closing control setting display portion 52, and a mold opening control setting display portion 53. In practice, the mold opening/closing setting display screen 36 is capable of setting or displaying other elements such as a maximum mold opening amount (mold opening/closing stroke) in most cases, but display of only portions related to the invention is Illustrated. Moreover, an arrangement relationship between the respective display portions is not limited to that shown in FIG. 3.

Figure 4:
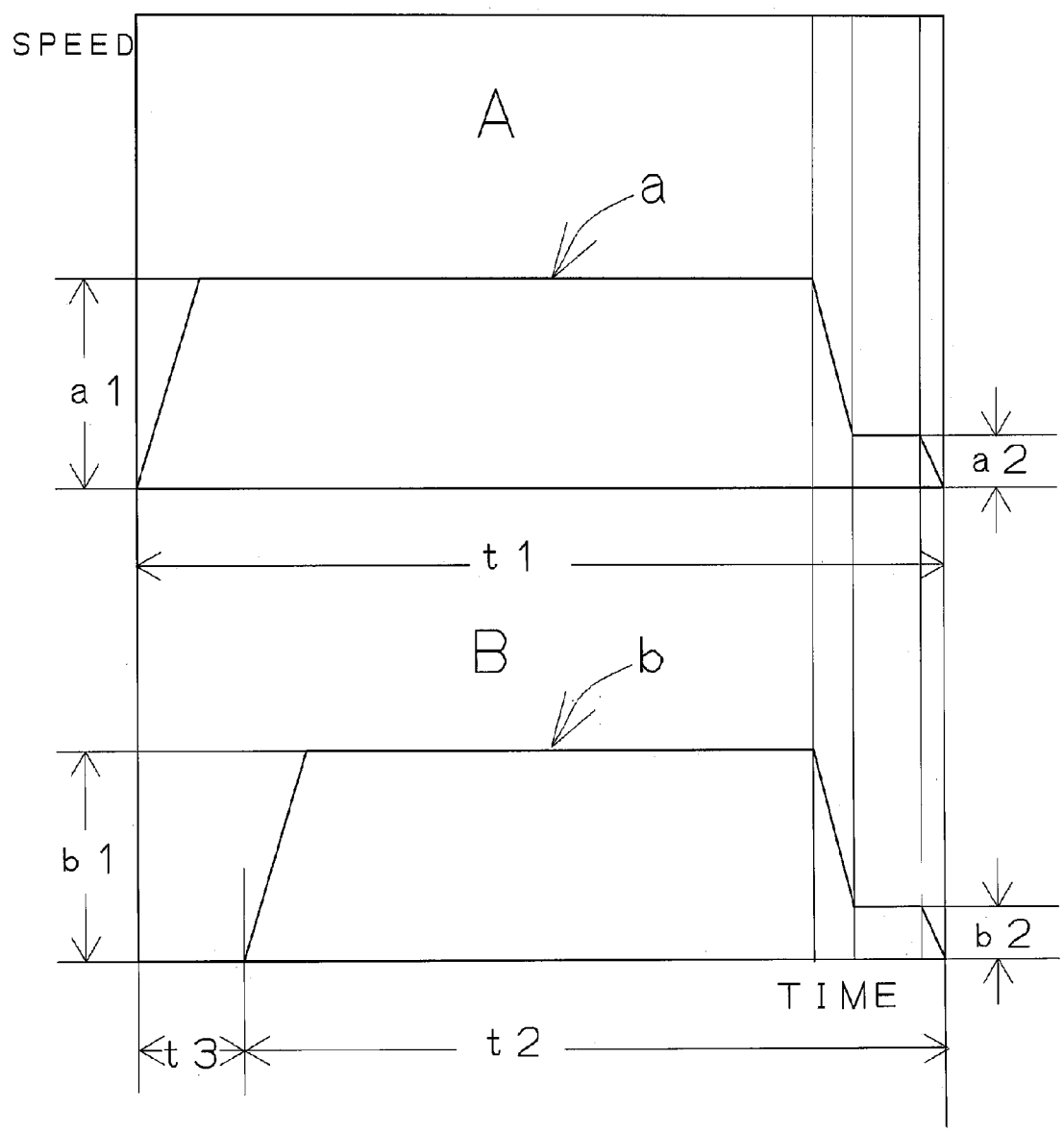
FIG. 4 is a diagram showing a relative mold closing speed when closing the molds of the injection molding machine according to the embodiment of the present invention.
Figure 5:
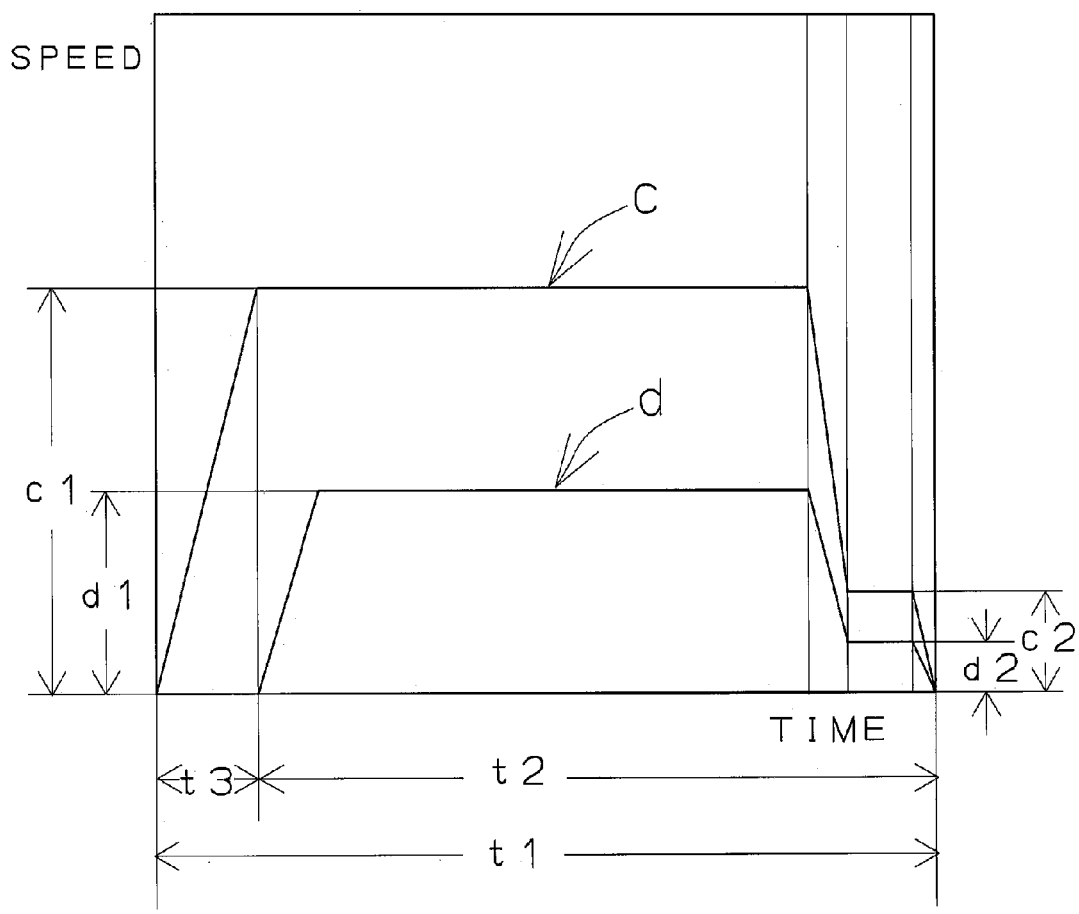
FIG. 5 is a diagram showing an absolute mold closing speed when closing the molds of the injection molding machine according to the embodiment of the present invention.

Next, with reference to the mold opening/closing setting display screen 36 shown in FIG. 3 and diagrams showing speeds and the like at the time of opening and closing the molds in FIGS. 4 and 5, a description will be given of the method for controlling the injection molding machine 11, and in particular, a method for setting mold opening/closing control items of the movable mold 14 and the intermediate mold 18 and a method for operating the movable mold 14 and the intermediate mold 18. In the present invention, a mold opening amount B between the movable mold 14 and the intermediate mold 18 (mold opening amount B) and a mold opening amount A between the stationary mold 16 and the intermediate mold 18 (mold opening amount A) are separately settable, and at least either a mold opening speed when opening the movable mold and the intermediate mold and a mold opening speed when opening the stationary mold and the intermediate mold or mold closing speeds b1 and b2 when closing the movable mold and the intermediate mold and mold closing speeds a1 and a2 when closing the stationary mold and the intermediate mold are settable by single setting.

More specifically, on a left side of a center part in FIG. 3, a setting column 51a of the mold opening amount A is provided, into which it is possible to input the mold opening amount A when opening the stationary mold and the intermediate mold. On a right side of the center part in FIG. 3, a setting column 51b of the mold opening amount B is provided, into which it is possible to input the mold opening amount B of the intermediate mold and the movable mold. Here, the mold opening amount indicates a mold opening completion position when a mold closing completion position is taken as 0, and in other words, indicates a distance between the molds at the completion of mold opening. It is possible to input different numeric values to the setting column 51a of the mold opening amount A and the setting column 51b of the mold opening amount B, and the mold opening amounts A and B, which are different from each other, are settable. However, it is self-evident that minimum values of the mold opening amounts A and B are restricted by the fact that the intermediate molds 18 are rotatable at the time of such mold opening. It is also self-evident that maximum values of the mold opening amount A and B are restricted by maximum strokes of the ball screw shafts 38 and 45 of the mold opening/closing means 19 and 20. For these setting values, when numeric values exceeding limit values are input, it is desirable to disable the input or to display an error message.

Above the setting column 51a of the mold opening amount A and the setting column 51b of the mold opening amount B in the mold opening amount setting display portion 51, the mold closing control setting display portion 52 that sets and displays a speed at the time of such mold closing is provided. The mold closing control setting display portion 52 is capable of setting mold closing speeds of high-speed mold closing and low-speed mold closing by ratios (percent) when a maximum speed is taken as 100, and switching positions of the control are also settable. In the present embodiment, with regard to the above-described mold closing speeds, a single setting value thereof is applied to both of the mold closing speed a when closing the stationary mold 16 and the intermediate mold 18 by the mold opening amount A and the mold closing speed b when closing the intermediate mold 18 and the movable mold 14 by the mold opening amount B. Therefore, by single setting, it is possible to set both of the mold closing speed a at the time of closing the stationary mold 16 and the intermediate mold 18 and the mold closing speed b at the time of closing the intermediate mold 18 and the movable mold 14. More specifically, as shown in FIG. 4, the speeds a1 and b1 at the time of the high-speed mold closing at the mold opening amount A and the mold opening amount B are controlled to be the same, and the speeds a2 and b2 at the time of the low-speed mold closing are also controlled to be the same. Note that the number of stages for inputting the mold closing speed and the input method thereof are merely examples and are not limited to those shown in the drawings. However, it is desirable that at least the speeds a1 and b1 on a most part at the time of the high-speed mold closing be the same speed.

The setting value of the mold closing speed in the mold closing control setting display portion 52 is a relative speed indicative of a gradual change in distance of each of a molding mold composed of the stationary mold 16 and the intermediate mold 18 and a molding mold composed of the intermediate mold 18 and the movable mold 14 when the molding mold is closed. Therefore, the setting value is not a moving speed (absolute speed) of the movable platen 15 with respect to the stationary platen 17 (or the bed 12), the moving speed being directly detected by the servomotor 37 of the mold opening/closing means 19 of the movable platen, or a moving speed (absolute speed) of the intermediate member 25 with respect to the movable platen 15, the moving speed being directly detected by the servomotor 43 of the mold opening/closing means 20 of the intermediate member. As shown in FIG. 5, a mold closing speed d (absolute speed) of the intermediate member 25 with respect to the movable platen 15, the mold closing speed d being directly detected by the servomotor 43 of the mold opening/closing means 20 of the intermediate member, is a half of a mold closing speed c (absolute speed) of the movable platen 15 with respect to the stationary platen 17, the mold closing speed c being directly detected by the servomotor 37 of the mold opening/closing means 19 of the movable platen. Moreover, a high-speed mold closing speed d1 (absolute speed) and a low-speed mold closing speed d2 (absolute speed) in the mold closing speed d of the intermediate member 25 with respect to the movable platen 15 are also halves of a high-speed mold closing speed c1 (absolute speed) and a low-speed mold closing speed c2 (absolute speed) in the mold closing speed c of the movable platen 15 with respect to the stationary platen 17, respectively.

Therefore, when the mold opening amount A between the stationary mold 16 and the intermediate mold 18 is larger than the mold opening amount B between the intermediate mold 18 and the movable mold 14, a required time differs between a mold closing time t1 in the case of the mold closing by the mold opening amount A and a mold closing time t2 in the case of the mold closing by the mold opening amount B. More specifically, after a predetermined time t3 elapses since a mold closing movement (high-speed mold closing movement) of the intermediate member 25 with respect to the movable platen 15 by the servomotor 37 of the mold opening/closing means 19 of the movable platen is started, a mold closing movement (high-speed mold closing movement) of the intermediate member 25 with respect to the movable platen 15 by the servomotor 43 of the mold opening/closing means 20 of the intermediate member is started. Then, the servomotor 43 and the servomotor 37 reach the maximum speed at substantially the same or the same timing and are then controlled to perform a high-speed mold closing control, and are switched to a low-speed mold closing control at substantially the same or the same timing. For this reason, as shown in FIG. 4, the mold closing control can be performed by the mold closing speeds a2 and b2 which are substantially equal or equal and are relatively low between the mold opening amount A and the mold opening amount B. Then, the mold closing speed a1 of the mold opening amount A and the mold closing speed b1 of the mold opening amount B are speeds equal to each other, and the mold closing speed a2 of the molding opening amount A and the mold closing speed b2 of the mold closing amount B are speeds equal to each other. Moreover, the mold closing speeds of the a1 and b1 are switched to the low speed at substantially the same or the same timing. Therefore, the intermediate mold 18 does not collide with the stationary mold 16 at high speed at the time of the mold closing.

Moreover, while input columns for switching positions of the control of the mold closing control setting display portion 52 are shared by input values of the mold opening amount A and the mold opening amount B, when the strokes of the mold opening amount A and the mold opening amount B are different from each other, then in the present embodiment, a distance of a portion of the high-speed mold closing control from such a mold closing starting side to a first switching position is automatically differentiated between the mold opening amount A and the mold opening amount B. However, in place of the above-described differentiation, another method may be adopted such as extending set distances of the respective portions excluding a slow portion on a longer stroke side.

Below the setting column 51a of the mold opening amount A and the setting column 51b of the mold opening amount B in the mold opening amount setting display portion 51, the mold opening control setting display portion 53 that sets and displays a speed at the time of the mold opening is provided. Like the mold closing control setting display portion 52, the mold opening control setting display portion 53 is capable of setting mold opening speeds of the high-speed mold opening and the low-speed mold opening by ratios (percent) when the maximum speed is taken as 100, and switching positions of the control are also settable. In the present embodiment, with regard to the above-described mold opening speeds and switching positions, a single setting value thereof is applied to both of the mold opening speed for the mold opening amount A between the stationary mold 16 and the intermediate mold 18 and the mold opening speed for the mold opening amount B between the intermediate mold 18 and the movable mold 14. Therefore, in the present embodiment, with regard to the above-described mold opening speeds, a single setting value thereof input to the mold opening control setting display portion 53 is applied to both of the mold opening speed for the mold opening amount A between the stationary mold 16 and the intermediate mold 18 at the time of the mold opening and the mold opening speed for the mold opening amount B between the intermediate mold 18 and the movable mold 14 at the time of the mold opening.

A relationship between the mold opening speed (relative speed) of the mold opening amount A of the stationary mold 16 and the intermediate mold 18 at the time of the mold opening and the mold opening speed (relative speed) of the mold opening amount B of the intermediate mold 18 and the movable mold 14 at the time of the mold opening and the mold opening speed (absolute speed) of the movable platen 15 with respect to the stationary platen 17 at the time of the mold opening and the mold opening speed (absolute speed) of the intermediate member 25 with respect to the movable platen 15 at the time of the mold opening is the same as the relationship described for the mold closing speeds. That is, even if the relative speeds of both of the molding molds at the time of the mold opening are the same, the moving speed (absolute speed) of the movable platen 15 with respect to the stationary platen 17 at the time of the mold opening is twice the moving speed (absolute speed) of the intermediate member 25 with respect to the movable platen 15.

However, the following points differ between the control at the time of the mold closing and the control at the time of the mold opening. That is, at the time of the mold closing, a mold closing operation of the molding mold in which the mold opening amount (relative movement distance at the time of the mold closing) is longer is started first, and a mold closing operation of the molding mold in which the mold opening amount is shorter is started later, whereby pieces of the timing of the low-speed mold closing are matched with each other. In contrast, at the time of the mold opening, the molding molds are started to be opened at the same time, whereby pieces of the timing of the low-speed mold opening are matched with each other. In this point, the control at the time of the mold opening differs from the control at the time of the mold closing. Then, both of the molding molds perform low speed mold opening operations at the same speed, and shift to high-speed mold opening operations at substantially the same or the same timing. Accordingly, since the high-speed mold opening operations of the intermediate member 25 and the movable platen 15 are started at the same time, there is no danger of collision between the molds. Then, since the high-speed mold opening speeds (relative speeds) of both of the molds are the same as described above, the mold opening of the molding mold in which the mold opening amount (relative movement distance at the time of the mold opening) is shorter is finished earlier, and after a predetermined time elapses, the mold opening of the molding mold in which the mold opening amount is longer ends.

Moreover, while input columns for switching positions of the control of the mold opening control setting display portion 53 are shared by input values of the mold opening amount A and the mold opening amount B, when the values of the mold opening amount A and the mold opening amount B are different from each other, then a distance of the high-speed setting performed from the last switching position is automatically differentiated between the mold opening amount A and the mold opening amount B. Note that another method may be adopted for the differentiation described above.

Then, in the present embodiment, as shown in FIG. 1, the taking-out machine 46 is inserted into the space of the stroke A opened more largely than the stroke B. Then, as an example, the composite molded product P mold-released by being stuck to the intermediate mold 18 is ejected by the ejector, held by the taking-out machine 46 and unloaded. As described above, the mold opening amount of the molding mold on one side in the injection molding machine 11 is increased, whereby it is easy to take out a deep-molded product having a long length in the mold opening/closing direction, the deep-molded product requiring a space when taking out from the mold, while preventing a mold opening/closing stroke of the whole of the injection molding machine 11 from being excessive. Moreover, such an advantage is brought that it is easy to insert an insert member into the mold for the purpose of the next insert molding.

Figure 6:
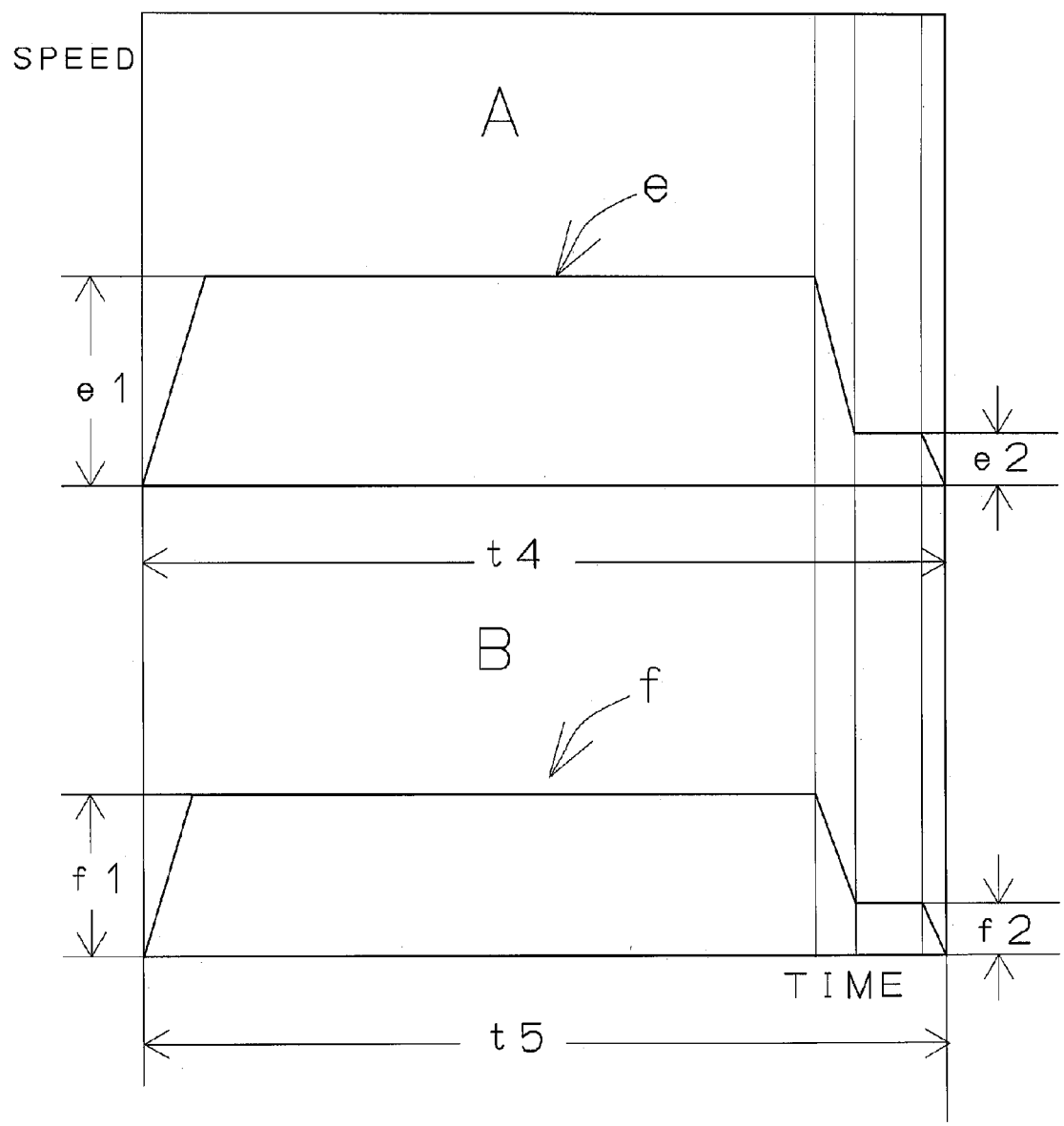
FIG. 6 is a schematic diagram showing a method for controlling an injection molding machine according to another embodiment of the present invention.

Note that, in the present invention, at least either the mold opening time of the movable mold 14 and the intermediate mold 18 and the mold opening time of the stationary mold 16 and the intermediate mold 18 or the mold closing time of the movable mold 14 and the intermediate mold 18 and the mold closing time of the stationary mold 16 and the intermediate mold 18 may be subjected to movement control for the same time t4 or t5 even if the mold opening amount B of the movable mold 14 and the intermediate mold 18 is different from the mold opening amount A of the stationary mold 16 and the intermediate mold 18. In that case, as shown in FIG. 6, with respect to a mold opening/closing speed e (relative speed) of the molding mold with the large mold opening amount (here, mold opening amount A), a mold opening/closing speed f (relative speed) of the molding mold with the small mold opening amount (here, mold opening amount B) is relatively lower. Also in these cases as well, it is desirable to keep the speeds e2 and f2 at the time of the low-speed mold closing and the low-speed mold opening common with each other even if the speeds e1 and f1 at the time of the high-speed mold closing and the high-speed mold opening are differentiated from each other. It is also desirable to keep the switching time from the high-speed mold closing to the low-speed mold closing common with each other. In this case, the absolute moving speed of the mold opening/closing means 19 of the movable platen and the mold opening/closing means 20 of the intermediate member at the time of the high-speed opening/closing is controlled not to be twice but to establish the following expression: (high-speed mold opening/closing distance of mold opening amount A/high-speed mold opening/closing moving speed of mold opening amount A)=(high-speed mold opening/closing distance of mold opening amount B/high-speed type opening/closing moving speed of mold opening amount B).

Figure 9:
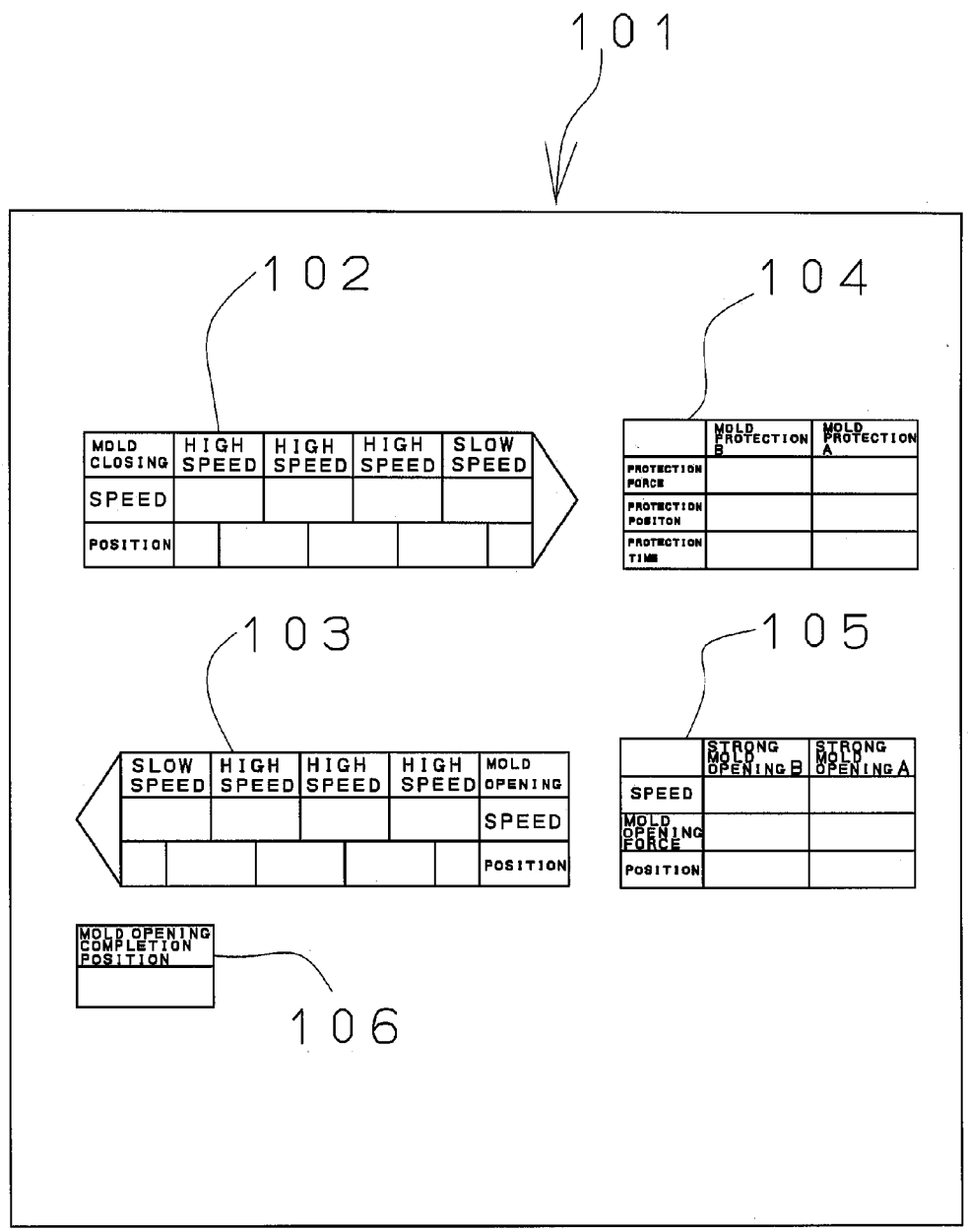
FIG. 9 is a diagram showing a setting screen of an injection molding machine according to a second embodiment of the present invention.

Next, an injection molding machine according to the second embodiment will be described with reference to FIG. 9. The injection molding machine for use in the second embodiment is the same as the injection molding machine 11 in FIG. 1, except for partial functions of the control device and a setting display screen. A mold opening/closing setting display screen 101 includes a mold closing control setting display portion 102, a mold opening control setting display portion 103, a mold protection setting display portion 104, a strong mold opening setting display portion 105, and a mold opening completion position display portion 106. In practice, the mold opening/closing setting display screen 101 is capable of setting or displaying other elements in most cases, but only portions related to the invention are Illustrated and described.

In the injection molding machine of the second embodiment, an input operation is performed from a window of the mold opening/closing setting display screen 101, whereby single setting enables setting of both of the setting value related to the molding using the movable mold 14 and the intermediate mold 18 and the setting value related to the molding using the stationary mold 16 and the intermediate mold 18. Specifically, like the example described in FIG. 3, with regard to the mold closing speed set and input from a window of the mold closing control setting display portion 102, one setting value thereof is applied to both of the mold closing speed a when closing the mold opening/closing stroke A of the stationary mold 16 and the intermediate mold 18 and the mold closing speed b when closing the mold opening/closing stroke B of the intermediate mold 18 and the movable mold 14. Moreover, likewise, also with regard to the switching position of the speed, a value set and input from one window is applied to both of the mold opening/closing stroke A and the mold opening/closing stroke B. Therefore, by single setting/input, it is possible to set both of the mold closing speed a at the time of closing the stationary mold 16 and the intermediate mold 18 and the mold closing speed b at the time of closing the intermediate mold 18 and the movable mold 14. In this case, the mold closing speeds a and b at the time of closing both of the molding molds are relative speeds with regard to the mold movement between the molds opposed to each other. Therefore, the moving speed (absolute speed) of the movable platen 15 with respect to the stationary platen 17 at the time of the mold closing is twice the moving speed (absolute speed) of the intermediate member 25 with respect to the movable platen 15, and this is the same as in the example of FIG. 5.

Next, a description will be given of the mold protection setting display portion 104 and the input (setting) of the setting value for the mold protection control. In the window of the mold protection setting display portion 104, it is possible to input both of a setting value of mold protection when closing the stationary mold 16 and the intermediate mold 18 and a setting value of mold protection when closing the intermediate mold 18 and the movable mold 14. For the setting values of the mold protection, it is possible to set mold protection force, a mold protection starting position (mold protection stroke) and a mold protection detection time. Then, in these setting display windows of the mold protection setting display portion 104, when a value is initially input to either one of the windows (for example, mold protection A), the same value as the value is automatically displayed in the other window (for example, mold protection B), and the same setting values are set thereinto. However, depending on the molding mold, there are cases where it is necessary to differentiate, from each other, a mold protection setting value when the stationary mold 16 and the intermediate mold 18 are closed and the mold protection setting value when the intermediate mold 18 and the movable mold 14 are closed. In preparation for that case, a function to input a different mold protection setting value for each mold is also provided. Specifically, when values of the mold protection are continuously input from one window and the other window, the setting values may be differentiated from each other, or a button such as "individual input of mold protection value" may be provided in another column, so that another value can be input.

Moreover, the setting from the windows of the mold opening control setting display portion 103 of the mold opening/closing setting display screen 101 is basically the same as the setting from the windows of the mold closing control setting display portion 102, and single setting enables setting of both of the setting value related to the molding using the movable mold 14 and the intermediate mold 18 and the setting value related to the molding using the stationary mold 16 and the intermediate mold 18. That is, with regard to the mold opening speeds input from the windows of the mold opening control setting display portion 103, a single setting value thereof is applied to both of the mold opening speed a when opening the stationary mold 16 and the intermediate mold 18 by the mold opening amount A and the mold opening speed when opening the intermediate mold 18 and the movable mold 14 by the mold opening amount B. Moreover, similarly, the switching position of the speed, which is input from the window of the mold opening control setting display portion 103, is also applied to both. Furthermore, a value obtained by summing the respective sections from the switching positions of the respective speeds is displayed as a mold opening completion position in the window of the mold opening completion position display portion 106.

Next, a description will be given of the strong mold opening setting display portion 105 and the input (setting) of the setting value for the mold protection. In the strong mold opening setting display portion 105, there can be input both of setting values of the strong mold opening control when mold releasing is performed at the beginning when the stationary mold 16 and the intermediate mold 18 are opened and setting values of the strong mold opening control when mold releasing is performed at the beginning when the intermediate mold 18 and the movable mold 14 are opened. The setting values input from the windows of the strong mold opening setting display portion 105 include speed, mold opening force, and a position (strong mold opening stroke). Then, with regard to these values, when each of the values is initially input to the window of the strong mold opening A as either one, the same value is automatically input to the window of the strong type opening B as the other, so that the same setting is made for both of windows. Note that, in the injection molding machine 11 of the present embodiment, the strong mold opening control between the stationary mold 16 and the intermediate mold 18 is performed using the mold clamping cylinders 22. Moreover, the strong mold opening control between the movable mold 14 and the intermediate mold 18 is performed by using the servomotor 37 of the mold opening/closing means 19 of the movable platen 15. Accordingly, the input values such as the speed and the mold opening force are calculated and controlled so that the respective actuators can exert the values.

Furthermore, depending on the type of the molding mold, it may be sometimes necessary to differentiate, from each other, the setting values of the strong mold opening control when opening the stationary mold 16 and the intermediate mold 18 and the setting values of the strong mold opening control when opening the intermediate mold 18 and the movable mold 14. In preparation for that case, the mold opening/closing setting display screen 101 has a function to input different setting values of the strong mold opening between the stroke between the stationary mold 16 and the intermediate mold 18 and the stroke between the movable mold 14 and the intermediate mold 18. Varieties of specific input means are conceived as in the case of mold protection control. Note that, if the position of the strong mold opening control (strong mold opening stroke) is set to be the same for each mold, then the mold opening amounts of the low speed section and the high speed section can be set to the same amount, and therefore, it is desirable to make the same setting for the respective mold in terms of control. Note that "strong mold opening" is a control to release the mold using the mold clamping cylinders 22 other than the mold opening/closing means 19 of the movable platen or four pieces of the mold opening/closing means 20 as examples of the intermediate members, and then to open the mold at a fixed distance. Therefore, in the present embodiment, a strong mold opening stroke of the mold clamping cylinders 22 and the strong mold opening stroke of the mold opening/closing means 20 are set to the same value by single setting input of the strong mold opening.

However, there is conceived a case where it is desired to differentiate, from each other, the strong mold opening stroke of the movable mold 14 and the intermediate mold 18 and the strong mold opening stroke of the stationary mold 16 and the intermediate mold 18. In that case, desirably, the high and low mold opening speeds of the mold opening stroke B between the movable mold 14 and the intermediate mold 18 and the high and low mold opening speeds of the mold opening stroke A of the stationary mold 16 and the intermediate mold 18 are changed, then the respective molds are moved simultaneously to the mold opening completion positions of the same mold opening amounts A and B. However, after the strong mold opening, the respective molds may be moved by the same mold opening stroke at the same mold opening speed, so that the mold opening amount A and the mold opening amount B may be differentiated from each other at the mold opening completion position.

Moreover, for both of the molding mold composed of the movable mold 14 and the intermediate mold 18 and the molding mold composed of the stationary mold 16 and the intermediate mold 18, core operations, air operations and mold heating operations thereof may also be performed by single setting. With regard to the start of operations of these mold mechanisms, the setting value may be input for either one of the molding molds in conjunction with the position of the intermediate molds 18 or the movable mold 14 at the time of the mold opening/closing control, and both of the mold mechanisms may be operated at the same position. Moreover, the setting value may be input for either one of the mold molds by a time (timer) from the start of the mold closing or the start of the mold opening start, so that both of the mold mechanisms may be operated at the same time.

Moreover, setting values on an injection side are also included in the setting values related to the molding using the movable mold 14 and the intermediate mold 18 and the setting values related to the molding using the stationary mold 16 and the intermediate mold 18. As an example, with regard to an injection delay time from when the mold clamping cylinders 22 are pressurized to a predetermined value and the mold clamping is completed until the injection devices 49 and 50 start the injection, the injection delay times of both of the injection devices 49 and 50 are changed by single setting on the setting display screen. In this case, setting input portions may be provided for each of the injection device 49 and the injection device 50, and a configuration may be adopted, in which, if a value of the setting input portion of the injection device 49 on one side is changed, then a value of the setting input portion of the injection device 50 on other side is also changed. Moreover, the setting input portion for injection delay may be single. Furthermore, also when the injection delay time from the completion of the mold clamping by the mold clamping device is differentiated between the injection device 49 and the injection device 50, the setting value of the injection device 50 on the other side may be set by adding or subtracting a predetermined value to a set input value of the injection delay of the injection devices 49 on one side. The same applies to the case of injection compression molding.

Moreover, with regard to the setting input in the injection device 49 and 50, in addition to the above, also for nozzle touch force, a metering time, a purge time, the number of times of purging, a difference in the heater energization starting time between the injection devices 49 and 50 when raising a temperature from a stop state (heater OFF state), and the like, both the setting values of the injection device 49 related to the molding of the stationary mold 16 and the intermediate mold 18 and the setting values of the injection device 50 related to the molding of the intermediate mold 18 and the movable mold 14 may be settable by single setting.

Figure 10:
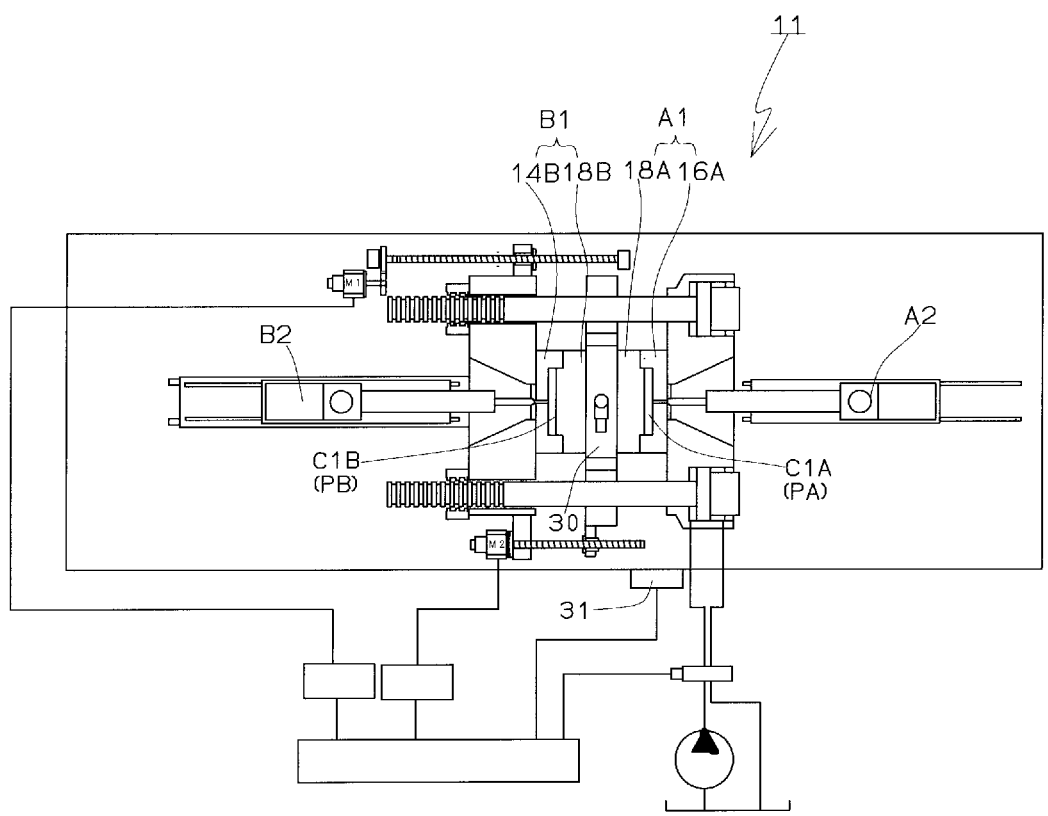
FIG. 10 is a schematic diagram showing an injection molding method of separately molding same molded products using same molds using the injection molding machine of the present invention.

Next, with reference to FIG. 10, a description will be given of an example of an injection molding method performed using the same molding molds A1 and B1 in the injection molding machine 11, the molding mold A1 being composed of a stationary mold 16A and an intermediate mold 18A, and the molding mold B1 being composed of an intermediate mold 18B and a movable mold 14B. In the case of this injection molding method, the rotating plate 30 and the intermediate molds 18A and 18B are not rotated every time when the molding is performed. The intermediate mold 18A is always closed with the stationary mold 16A to form a cavity C1A of the molding mold A1. Moreover, the intermediate mold 18B is always closed with the movable mold 14B to form a cavity C1B of the molding mold B1. The same molded products are molded in the respective cavities C1A and C1B. In this case, with regard to one of the molding mold A1 and the molding mold B1, operation timing (timer), moving distance, cooling time and the like of a core operation, an ejector operation or a valve gate operation are set and input from the setting display screen of the control panel 31. In this way, setting of the other of the molding mold B1 and the molding mold A1 is set to be also performed at the same time. Moreover, a single setting input portion for molding the same molded products may be provided on the setting display screen of the control panel 31, and the setting may be set to be performed simultaneously for the molding mold A1 and the molding mold B1 if setting input is made once from the setting input portion.

In the case of using the injection molding machine 11, using the same molding molds A1 and B1, and separately molding the same molded product PA and molded product PB without rotating the rotating plate 30, if an injection device A2 and an injection device B2 have the same specifications, if molding conditions are set for one of the injection device A2 and the injection device B2 from the control panel 31, then setting may be performed simultaneously for the other of the injection device B2 and the injection device A2. Alternatively, the single setting input portion for molding the same molded producst may be provided on the setting display screen of the control panel 31, and the setting may be set to be performed simultaneously for the injection device A2 and the injection device B2 if the setting input is made from the setting input portion. In the case of using the same molding molds A1 and B1 or the same injection devices A2 and B2, it is frequent that slight differences are present between the molding molds A1 and B1 or between the injection devices A2 and B2. Therefore, desirably, the molding molds A1 and B1 or the injection devices A2 and B2 are simultaneously subjected to the setting at first and are used for molding the molded products PA and PB, and then states of the molded products PA and PB are checked, whereby it is made possible to finely adjust condition values of at least one of the devices described above later.

Moreover, in the injection molding method in which the rotating plate 30 and the intermediate molds 18A and 18B are not rotated every time when the molding is performed, it is conceivable to use different molds for the molding mold A1 composed of the stationary mold 16A and the intermediate mold 18A and the molding mold B1 composed of the intermediate mold 18B and the movable mold 14B. Even in the case of molding different molded products by these molding molds A1 and B1, the mold clamping completion time is generally the same, so that a cooling time is common. Therefore, if setting/input of a cooling time of the molding mold A1 on one side is performed from the setting display screen of the control panel 31, then a cooling time of the molding mold B1 on the other side is also set to be the same time or an approximate time in conduction therewith.

Figure 7:
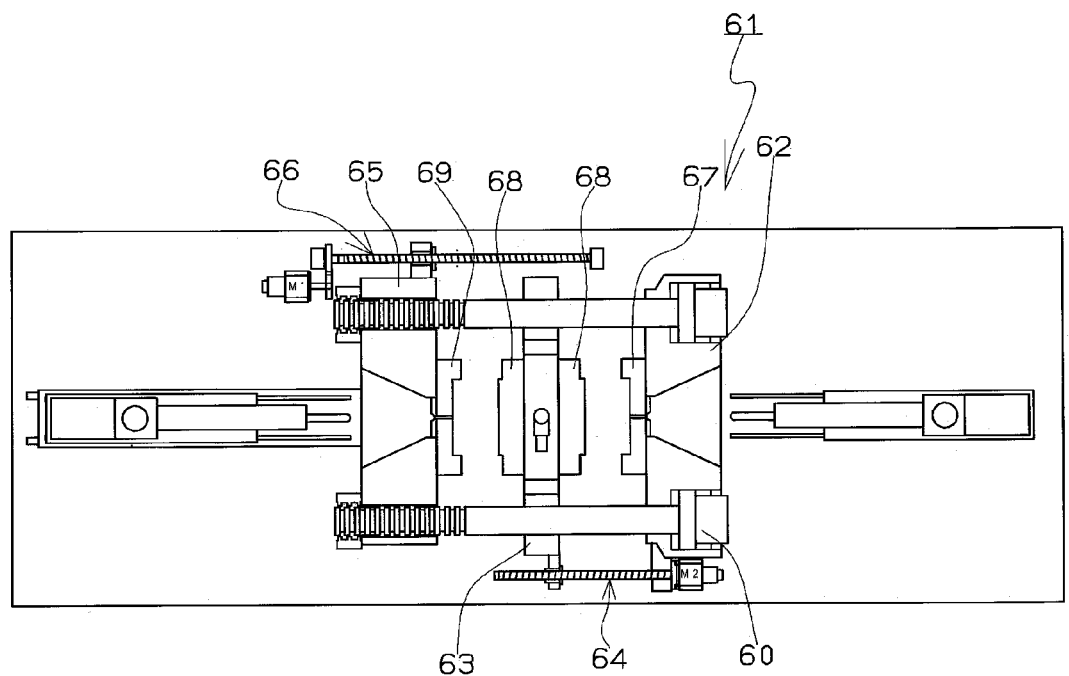
FIG. 7 is a schematic diagram showing the injection molding machine according to the another embodiment of the present invention.
Figure 8:
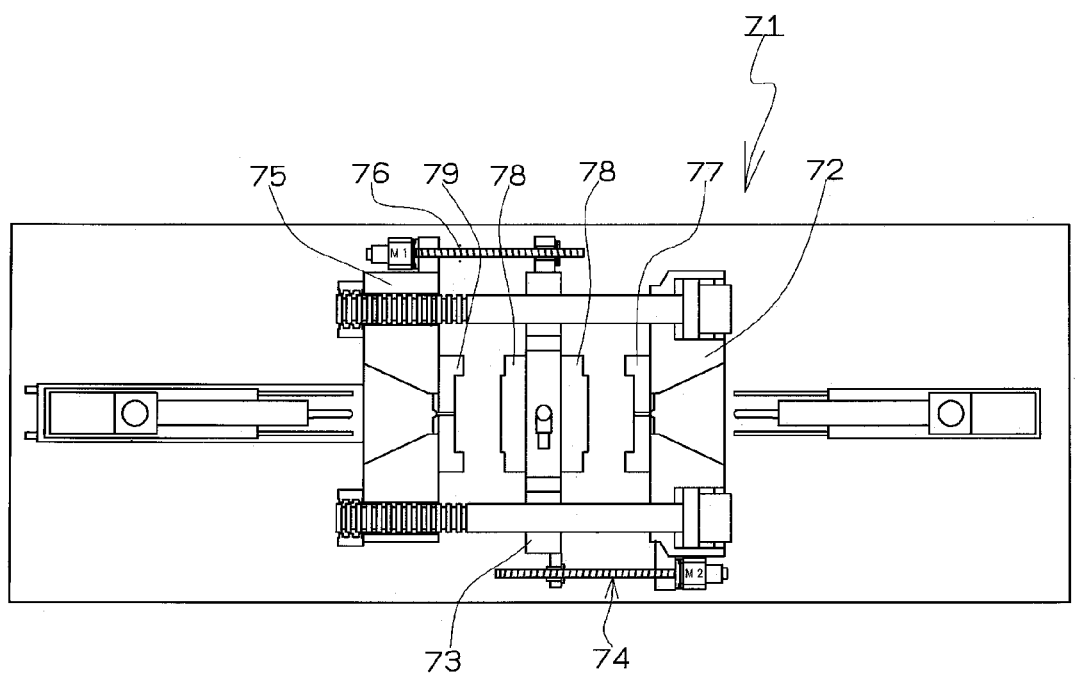
FIG. 8 is a schematic diagram showing an injection molding machine according to still another embodiment of the present invention.

Moreover, the injection molding machine for use in the present invention may be injection molding machines 61 and 71 in which mold opening/closing means are disposed as shown in FIGS. 7 and 8. In the injection molding machine 61 of FIG. 7, mold opening/closing means 64 (electric mechanism or hydraulic mechanism) for an intermediate member 63 is attached between a stationary platen 62 (or base) and the intermediate member 63, and mold opening/closing means 66 (electric mechanism or hydraulic mechanism) for a movable platen 65 is attached between the stationary platen 62 (or base) and the movable platen 65. Therefore, it is possible to detect a moving speed of the intermediate member 63 and a moving speed of the movable platen 65 individually as speeds with respect to the stationary platen 62 (or the base). As far as the mold opening/closing control is concerned, there is a possibility that the control can be simplified as compared with those shown in FIGS. 1 and 2.

Meanwhile, in the injection molding machine 71 of FIG. 8, first mold opening/closing means 74 is attached between a stationary platen 72 (or base) and an intermediate member 73, and a second mold opening/closing means 76 is attached between the intermediate member 73 and the movable platen 75. Therefore, the movable platen 75 is moved by the first and second two mold opening/closing means 74 and 76. Therefore, also with regard to the injection molding machine 71 of FIG. 8, moving amounts and moving speeds of the first mold opening/closing means 74 and the second mold opening/closing means 76 directly become movement amounts and moving speeds of the molding molds. Accordingly, there is a possibility that the control can be simplified as far as the mold opening/closing control is concerned. Even in the case of these injection molding machines 61 and 71, mold opening amounts between the movable molds 69 and 79 and the intermediate molds 68 and 78 and mold opening amounts between the stationary molds 67 and 77 and the intermediate molds 68 and 78 are separately settable, and at least either mold opening speeds of molding molds composed of the movable molds 69 and 79 and the intermediate molds 68 and 78 and mold opening speeds of molding molds composed of the stationary molds 67 and 77 and the intermediate molds 68 and 78 or mold closing speeds of the molding molds composed of the movable molds 69 and 79 and the intermediate molds 68 and 78 and mold closing speeds of the molding molds composed of the stationary molds 67 and 77 and the intermediate molds 68 and 78 are settable by single setting. Moreover, as a modified example of the injection molding machine 71 of FIG. 8, such an injection molding machine may also be acceptable, in which the rotatable intermediate member 73 and the intermediate mold 78 are fixed in the mold opening/closing direction or are enabled to move only slightly, and a first movable platen and a second movable platen, which are individually provided on both sides of the intermediate member 73, are moved toward the intermediate member 73 in the mold opening/closing direction.

Moreover, in the above embodiment, the intermediate molds 18 are attached to both surfaces of the rotating plate 30 attached to the intermediate member 25. However, such intermediate molds may be individually attached to four surfaces of the rotating disc. Moreover, in each of the injection molding machines 11, 61 and 71 in FIGS. 1, 7 and 8, the rotating plate is not provided in the intermediate member, and the intermediate molds may be directly attached onto a rotating table movable in the mold opening/closing direction on the base. In that case, the mold opening/closing means is attached to the rotating table which is the intermediate member.

The present invention is not limited to the embodiments though modified examples thereof are not mentioned in detail, and it goes without saying that combinations of the above descriptions and changes made based on the spirit of the present invention by those skilled in the art are also applicable.

What is claimed is:

1. A method for controlling an injection molding machine in which first and second intermediate molds are disposed movably in a mold opening/closing direction between a movable platen attached with a movable mold and a stationary platen attached with a stationary mold, and by mold opening/closing means that include a movable platen moving means for moving the movable platen and intermediate molds moving means for moving the first and second intermediate molds, the stationary mold and the first and second intermediate molds are closed, and the movable mold and the first and second intermediate molds are closed, cavities are formed between the stationary mold and the first intermediate mold and between the second intermediate mold and the movable mold, and mold clamping is performed by mold clamping means, the method comprising:

single setting to set at least either
a mold opening relative speed setting value when opening the movable mold and the first and second intermediate molds and a mold opening relative speed setting value when opening the stationary mold and the first and second intermediate molds, wherein the mold opening relative speed setting value is a relative speed indicative of a change in distance of the stationary mold relative to the first intermediate mold at the time of mold opening and a change in distance of the second intermediate mold relative to the movable mold at the time of mold opening, or a mold closing relative speed setting value when closing the movable mold and the first and second intermediate molds and a mold closing relative speed setting value when closing the stationary mold and the first and second intermediate molds, wherein the mold closing relative speed setting value is a relative speed indicative of a change in distance of the stationary mold relative to the first intermediate mold at the time of mold closing and a change in distance of the second intermediate mold relative to the movable mold at the time of mold closing;

wherein, in response to the single setting of the mold opening relative speed setting value or the mold closing relative speed setting value, respectively at the time of mold opening or mold closing, first and second different absolute speed control values are automatically calculated; and controlling the movable platen moving means to move the movable platen the first absolute speed control value, and controlling the intermediate molds moving means to move the first and second intermediate molds the second absolute speed control value.

2. The method for controlling an injection molding machine according to claim 1,
wherein, by the single setting,
a switching position of the mold opening relative speed setting value of the movable mold and the first and second intermediate molds and a switching position of the mold opening relative speed setting value of the stationary mold and the first and second intermediate molds are set at the time of the mold opening;

or a switching position of the mold closing relative speed setting value of the movable mold and the first and second intermediate molds and a switching position of the mold closing relative speed setting value of the stationary mold and the first and second intermediate molds are set at the time of the mold closing.

3. The method for controlling an injection molding machine according to claim 1, wherein at least either a mold opening time of the movable mold and the intermediate mold and a mold opening time of the stationary mold and the intermediate mold or a mold closing time of the movable mold and the intermediate mold and a mold closing time of the stationary mold and the intermediate mold is subjected to movement control for a same time even if the mold opening amount between the movable mold and the intermediate mold is different from the mold opening amount between the stationary mold and the intermediate mold.

4. The method for controlling an injection molding machine according to claim 1, comprising rotating the first and second intermediate molds about an axis perpendicular to the mold opening/closing direction.

5. The method for controlling an injection molding machine according to claim 1,
wherein the single setting sets at least either
the mold opening relative speed setting value when opening the movable mold and the second intermediate mold and the mold opening relative speed setting value when opening the stationary mold and the first intermediate mold or
the mold closing relative speed setting value when closing the movable mold and the second intermediate mold and the mold closing relative speed setting value when closing the stationary mold and the first intermediate mold;

or wherein the single setting sets at least either
the mold opening relative speed setting value when opening the movable mold and the first intermediate mold and the mold opening relative speed setting value when opening the stationary mold and the second intermediate mold or
the mold closing relative speed setting value when closing the movable mold and the first intermediate mold and the mold closing relative speed setting value when closing the stationary mold and the second intermediate mold.

6. An injection molding machine in which first and second intermediate molds are disposed movably in a mold opening/closing direction between a movable platen attached with a movable mold and a stationary platen attached with a stationary mold, and by mold opening/closing means that include a movable platen moving means for moving the movable platen and intermediate molds moving means for moving the first and second intermediate molds, the stationary mold and the first and second intermediate molds are closed, and the movable mold and the first and second intermediate molds are closed, cavities are formed between the stationary mold and the first intermediate mold and between the second intermediate mold and the movable mold, and mold clamping is performed by mold clamping means, the injection molding machine comprising:
a controller configured to receive a single setting;
wherein the controller is configured to set, by the single setting, at least either
a mold opening relative speed setting value when opening the movable mold and the first and second intermediate molds and a mold opening relative speed setting value when opening the stationary mold and the first and second intermediate molds, wherein the mold opening relative speed setting value is a relative speed indicative of a change in distance of the stationary mold relative to the first intermediate mold at the time of mold opening and a change in distance of the second intermediate mold relative to the movable mold at the time of mold opening, or a mold closing relative speed setting value when closing the movable mold and the first and second intermediate molds and a mold closing relative speed setting value when closing the stationary mold and the first and second intermediate molds, wherein the mold closing relative speed setting value is a relative speed indicative of a change in distance of the stationary mold relative to the first intermediate mold at the time of mold closing and a change in distance of the second intermediate mold relative to the movable mold at the time of mold closing;

wherein, in response to the single setting of the mold opening relative speed setting value or the mold closing relative speed setting value, respectively at the time of mold opening or mold closing, the controller is configured to automatically calculate first and second different absolute speed control values; and wherein the controller is configured to control the movable platen moving means to move the movable platen the first absolute speed control value, and to control the intermediate molds moving means to move the first and second intermediate molds the second absolute speed control value.

7. The injection molding machine according to claim 6, wherein single setting enables setting of both of a setting value of an injection device related to the molding using the movable mold and the second intermediate mold and a setting value of an injection device related to the molding using the stationary mold and the first intermediate mold.

8. The injection molding machine according to claim 6, wherein at least either a mold opening time of the movable mold and the intermediate mold and a mold opening time of the stationary mold and the intermediate mold or a mold closing time of the movable mold and the intermediate mold and a mold closing time of the stationary mold and the intermediate mold is subjected to movement control for a same time even if the mold opening amount between the movable mold and the intermediate mold is different from the mold opening amount between the stationary mold and the intermediate mold.

9. The injection molding machine according to claim 6, wherein the first and second intermediate molds are rotatable about an axis perpendicular to the mold opening/closing direction.

10. The injection molding machine according to claim 6, wherein the controller is configured to set, by the single setting, at least either the mold opening relative speed setting value when opening the movable mold and the second intermediate mold and the mold opening relative speed setting value when opening the stationary mold and the first intermediate mold or the mold closing relative speed setting value when closing the movable mold and the second intermediate mold and the mold closing relative speed setting value when closing the stationary mold and the first intermediate mold;

or wherein the controller is configured to set, by the single setting, at least either the mold opening relative speed setting value when opening the movable mold and the first intermediate mold and the mold opening relative speed setting value when opening the stationary mold and the second intermediate mold or the mold closing relative speed setting value when closing the movable mold and the first intermediate mold and the mold closing relative speed setting value when closing the stationary mold and the second intermediate mold.

* * * * *